United States Patent [19]
Blaner et al.

[11] Patent Number: 5,515,306
[45] Date of Patent: May 7, 1996

[54] PROCESSING SYSTEM AND METHOD FOR MINIMUM/MAXIMUM NUMBER DETERMINATION

[75] Inventors: Bartholomew Blaner, Underhill Center; Dennis R. Strouphauer, S. Burlington, both of Vt.

[73] Assignee: IBM, Armonk, N.Y.

[21] Appl. No.: 388,324

[22] Filed: Feb. 14, 1995

[51] Int. Cl.⁶ .................... G06F 7/00; G06F 7/02
[52] U.S. Cl. .................... 364/715.06; 340/146.2
[58] Field of Search .................. 364/715.06; 340/146.2

[56] References Cited

U.S. PATENT DOCUMENTS

| | | |
|---|---|---|
| 4,539,549 | 9/1985 | Hong et al. . |
| 4,567,572 | 1/1986 | Morris et al. . |
| 4,734,876 | 3/1988 | Williams . |
| 4,774,688 | 9/1988 | Kobayashi et al. . |
| 4,856,029 | 8/1989 | Geyer et al. . |
| 4,998,219 | 3/1991 | Fravenglass . |
| 5,051,939 | 9/1991 | Nakamura .................... 364/715.06 |
| 5,072,418 | 12/1991 | Boutaud et al. . |
| 5,187,675 | 2/1993 | Dent et al. . |
| 5,262,969 | 11/1993 | Ishihara . |

OTHER PUBLICATIONS

Gourlay et al, "Circuit for Finding the Minimum or Maximum of a set of Binary Numbers," IBM Tech. Discl. Bull., vol. 25, No. 7A, Dec. 1982, pp. 3318–3320.

*Primary Examiner*—Tan V. Mai
*Attorney, Agent, or Firm*—Schmeiser, Olsen & Watts

[57] ABSTRACT

A data processing system with an arithmetic processing unit (ALU) and control unit is disclosed, wherein the ALU includes a first and second carry circuit and multiplexing device. Two n-bit, 2's complement operands A and B are inputted into the ALU for minimum/maximum number determination. The first carry circuit outputs a first carry into a sign bit position for the operation A+B+0, and the second carry circuit outputs a second carry into a second sign bit position for the operation A+~B+1. Control means for receiving minimum, minimum magnitude, maximum, and maximum magnitude operations of A and B and the carry outputs of the carry circuits outputs a control signal to the multiplexing device to output either A or B from the ALU.

9 Claims, 5 Drawing Sheets

PROCESSING SYSTEM AND METHOD FOR MINIMUM/MAXIMUM NUMBER DETERMINATION

BACKGROUND OF THE INVENTION

1. Technical Field

The invention relates generally to data processing systems and, more specifically, to digital signal processing systems that determine minimum/maximum magnitude digital signal levels.

2. Background Art

In digital signal processing systems, many processing functions require determination of a minimum or maximum magnitude level signal sample in a block of signal samples. In typical digital signal processors (DSPs), the magnitude level is generally found by performing a series of instructions. This method can be very time consuming and will hinder performance of signal level determination since multiple processor execution cycles are needed to perform these instructions.

To overcome this problem, other systems developed a technique for determining the minimum, minimum magnitude, maximum, or maximum magnitude of two n-bit 2's complement operands (A and B) in one processor cycle, where n is the processor word size. The technique used the DSP arithmetic logic unit (ALU) to add or subtract (addition with 2's complementation of the B operand) the A and B operands. Then, the sign (negative or positive) of the result and the ALU overflow output is interpreted, and A or B is chosen as the subsequent output of the ALU.

Even though this system decreased the instruction path length and execution cycles per instruction of the processor, it increased the processor cycle time due to the delayed ALU result, the cycle-time limiting path of the DSP.

The reason for the delayed ALU result is twofold. First, for the minimum magnitude and maximum magnitude operations, if the ALU B operand is negative, it must be 2's complemented. That is, once the B operand has propagated to the ALU B input, its sign bit must be examined and a control signal developed that, if the sign bit is 1, causes the B operand to be 1's complemented (inverted) and incremented by 1. This increases the delay path through the ALU, because the computation cannot proceed until the control signal has been determined and applied.

Second, for all minimum or maximum operations, the ALU performs an addition and the sign bit of the result of the addition is used to select the A or B operand in lieu of the ALU result. It is known that the sign bit of the ALU result has the longest delay of any ALU result bit. Therefore, using the sign bit to select the result for a minimum or maximum operation adds further delays to the ALU result.

Other examples of data processing systems that determine the maximum/minimum numeral or signal in a series of numerals or signals, or similar ascertations, may be found in the following United States Patents which are hereby incorporated herein by reference: U.S. Pat. No. 5,072,418, "Series Maximum/Minimum Function Computing Devices, Systems and Methods," (issued December 1991 to Boutaud et al and assigned to Texas Instruments Inc.); U.S. Pat. No. 4,567,572, "Fast Parallel Sorting Processor," (issued January 198 to Morris et al and assigned to N.S.A.); U.S. Pat. No. 4,774,688, "Data Processing System for Determining Min/Max in a Single Operation Cycle as a Result of a Single Instruction," (issued September 1988 to Kobayashi et al and assigned to IBM Corp); U.S. Pat. No. 4,998,219, "Method and Apparatus for Determining the Greatest Value of a Binary Number and for Minimizing Any Uncertainty Associated with the Determination," (issued March 1991 to Frauenglass and assigned to AIL, Systems, Inc); U.S. Pat. No. 4,856,029, "Technique for Processing a Digital Signal Having a Zero Overhead Sync," (issued August 1989 to Geyer et al and assigned to Eastman Kodak Co.); U.S. Pat. No. 5,262,969, "Arrangement and Method of Ascertaining Data Word Number of Maximum or Minimum in a Plurality of Data Words," (issued November 1993 to Ishihara and assigned to NEC Corp.); U.S. Pat. No. 4,734,876, "Circuit for Selecting One of a Plurality of Exponential Values to a Predetermined Base to Provide a Maximum Value," (issued March 1988 to Williams and assigned to Motorola, Inc.); U.S. Pat. No. 5,187,675, "Maximum Search Circuit," (issued February 1993 to Dent et al and assigned to Ericsson-GE Mobile Communications Holding Inc.); and U.S. Pat. No. 4,539,549, "Method and Apparatus for Determining Minimum/Maximum of Multiple Data Words," (issued September 1985 to Hong et al and assigned to IBM Corp.).

Although each aforementioned patent provides a way to determine the maximum/minimum resultant numeral, they either are not able to do it within the ALU, and subsequently, the performance time of the system is increased, or they do not perform with maximum/minimum magnitude operations.

SUMMARY OF THE INVENTION

It is thus an object of the present invention to provide a data processing system that determines minimum/maximum magnitude digital signal levels and thus enhances performance of signal level determination.

It is another object of the invention to provide a system that will reduce the critical path delay of the ALU by eliminating conditional 2's complementation of B operand.

It is a further object of the invention to provide a data processing system that will reduce the critical path delay by removing dependency from result sign (the slowest bit of the result) for result selection.

The foregoing and other objects of the invention are realized by a data processing system with an ALU and control means, wherein the ALU includes a first and second carry circuits and multiplexing means. Two n-bit, 2's complement operands A and B are inputted into the ALU for minimum/maximum number determination. The first carry circuit outputs a first carry into a sign bit position for the operation A+B+0, and the second carry circuit outputs a second carry into a second sign bit position for the operation A+~B+1, (~B meaning the 1's complement of B, or B inverted) thus eliminating conditional complementation. Control means for receiving minimum, minimum magnitude, maximum, and maximum magnitude operations of A and B and the carry outputs of the carry circuits outputs a control signal, which is dependant upon the relative magnitude of the operand, to the multiplexing means to output either A or B from the ALU. The result selection of the multiplexing means and thus the output of the ALU is dependent on the operands (A and B) signs and the carry into sign bit, eliminating a dependence on the result sign.

BRIEF DESCRIPTION OF DRAWINGS

The foregoing and other objects, features and advantages of the invention will be apparent from the following more particular description of preferred embodiments of the invention, as illustrated in the accompanying drawings.

DETAILED DESCRIPTION OF THE BEST MODE FOR CARRYING OUT THE INVENTION

Figure 1:
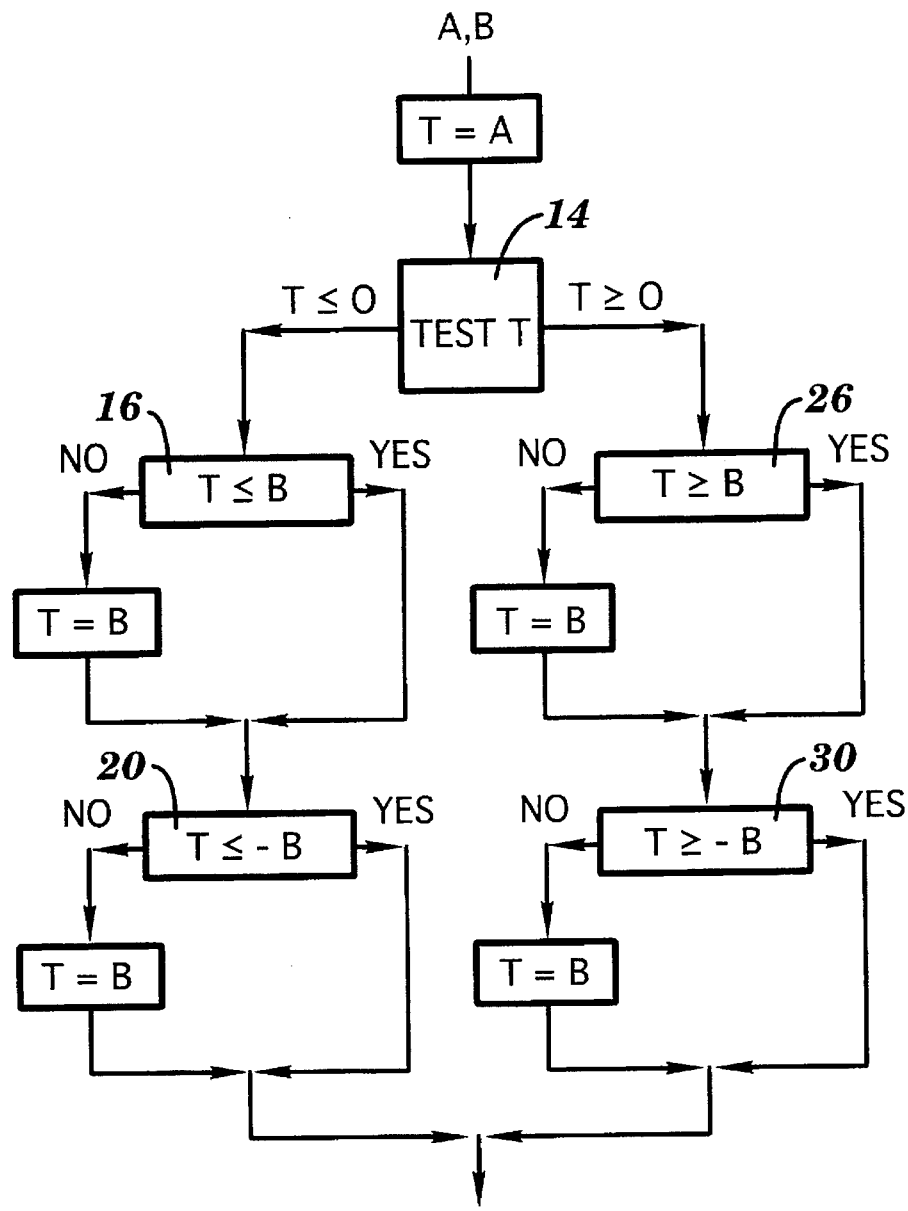
FIGS. 1 and 2 are flow diagrams illustrating the prior art process of determining the maximum magnitude signal level between two signal levels.

With reference to FIG. 1, there is shown an example of a prior art process in determining the maximum magnitude signal level sample between signal levels samples A and B. First, a test is performed on A to see whether A is greater than or less than zero (box 14). A will then be compared to B (boxes 16 and 26) and, depending on the results, to −B (boxes 20 and 30). The maximum magnitude signal level sample will then be outputted, i.e. T=A when |A|≧|B|; T=B when |A|<|B|.

Figure 2:
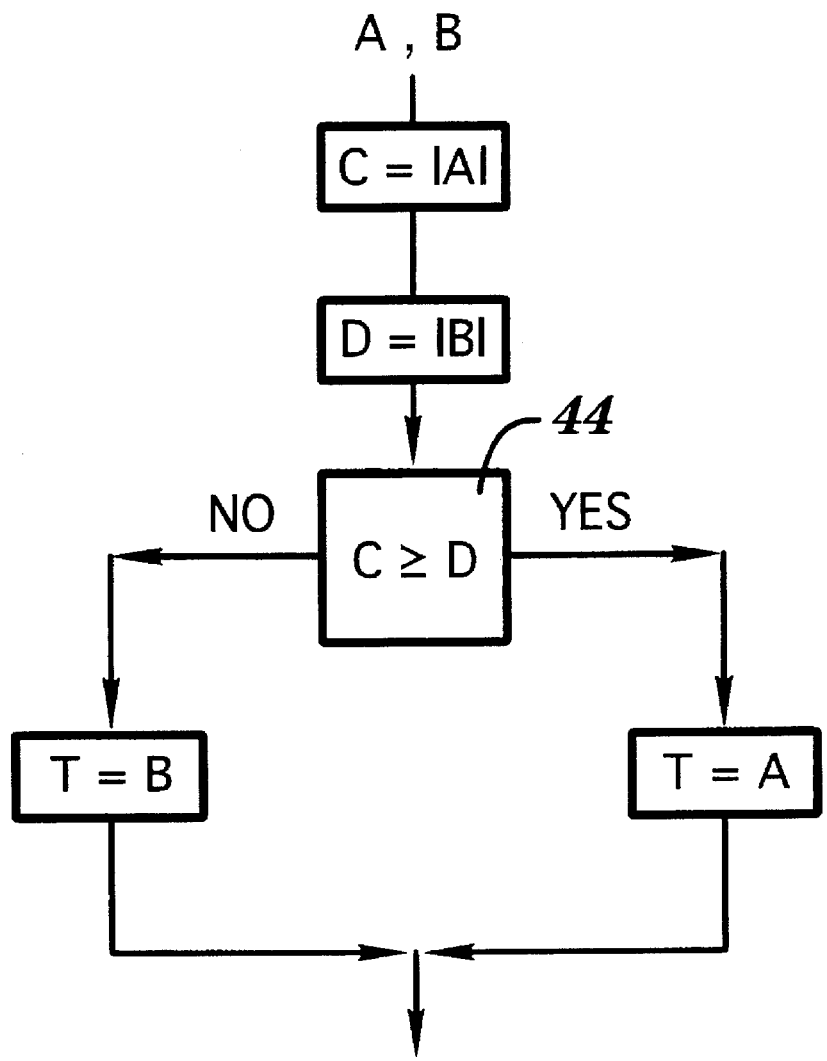

FIG. 2 illustrates a more efficient approach of the prior art in determining a maximum/minimum signal level sample for those processors that have an absolute value or magnitude function. In box 44, the magnitudes of A and B are compared, resulting in an output T that will be the maximum magnitude signal level sample. Both methods as shown in FIG. 1 and 2 require multiple processor execution cycles, which, for a block of 128 signal level samples to be tested, could require up to 1024 operations to determine the sample with the largest magnitude.

Figure 3:
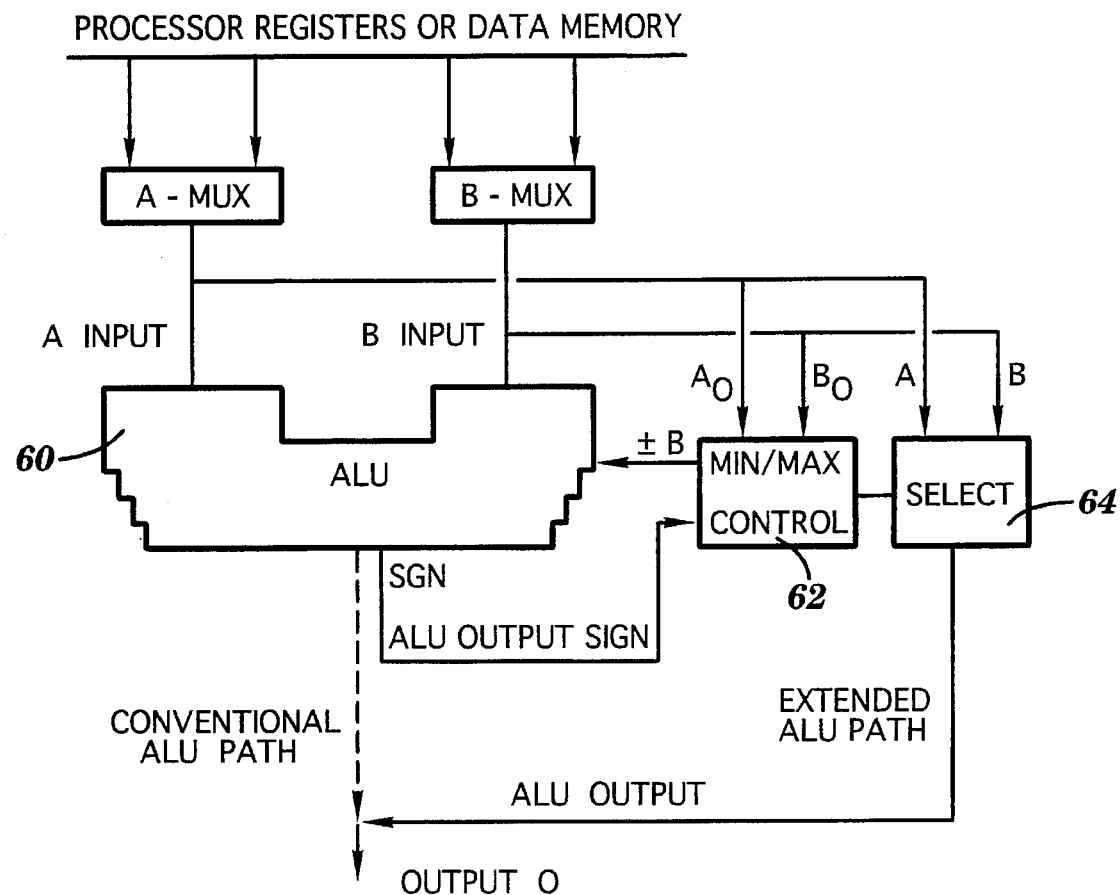
FIG. 3 is a block diagram of the data processing system of the prior art.

As shown in FIG. 3, one data processing system of the prior art uses the processor's ALU 60 to compute additions and subtractions of inputs A and B, thus decreasing the execution cycles per instruction. The ALU 60 is used in conjunction with a control circuit 62 and selector 64 to select an input operand (A or B) as the output to the ALU 60. The signs of the operands A and B (Ao and Bo) are inputted into the control circuit 62 to determine whether the ALU should add or subtract A and B, i.e. whether or not the 2's complement of B should be performed. Then, after the addition, or subtraction occurs, the resultant sign from the ALU is interpreted by the control circuit 62 to determine which input operand is to be selected as the output.

As aforementioned, this system and method may decrease the execution cycles per instruction, but it also delays the availability of the ALU result since the 2's complementation of the B operand is conditional (i.e. the computation cannot proceed until the control signal has been determined and applied), and the sign bit (the slowest ALU result bit) obtained from the addition or subtraction of the A and B operands is used to select the result for the minimum or maximum operation.

Figure 4:
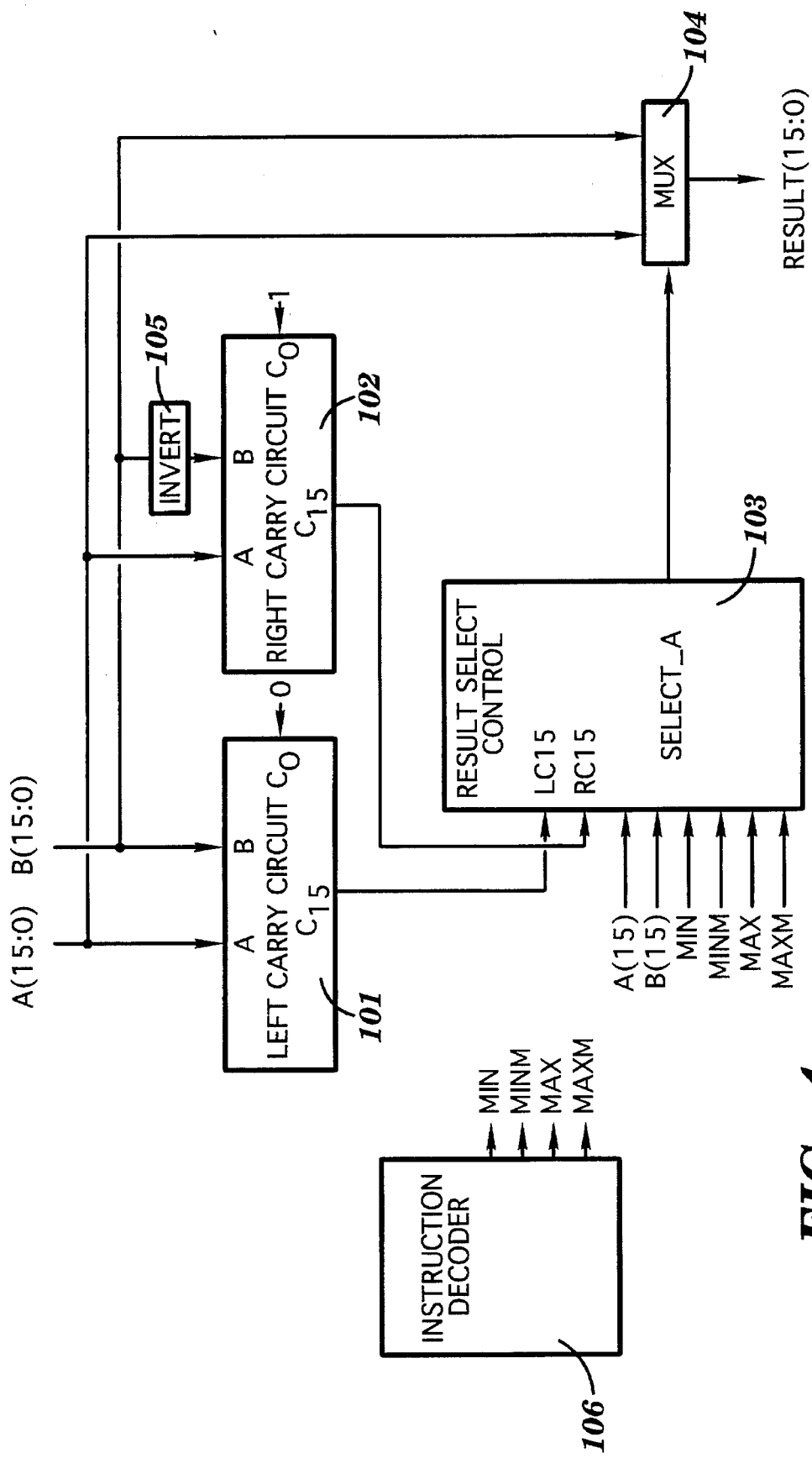
FIG. 4 is a preferred embodiment of the data processing system of the present invention.

As illustrated in FIG. 4, the preferred embodiment of the present invention comprises an ALU including a first carry circuit (or Left Carry Circuit) 101, a second carry circuit (or Right Carry Circuit) 102 and multiplexer 104. While the invention will be presented in terms of operations of 16-bit words, it will be understood by those skilled in the art that the invention may be readily adapted to other word widths.

A 16-bit operand $A_{15:0}$ is connected to the A input of the Left Carry Circuit 101 and to the A input of the Right Carry Circuit 102. A 16-bit operand $B_{15:0}$ is connected to the B input of the Left Carry Circuit 101 and to the input of the inverter 105. The output of the inverter 105 is connected to the B input of the Right Carry Circuit 102. The Left Carry Circuit 101 and the Right Carry Circuit 102 are identical and implement the recursive carry equation:

$$C_{i+1}=A_iB_i+(A_i+B_i)C_i$$

where $C_{i+1}$ is the carry out of the ith bit position and $C_0$ is defined to be the carry into the 0th bit position. Techniques such as carry-lookahead circuits or Manchester carry chains would be applicable in implementing this equation in a high-speed application, but a variety of techniques may also be used that are within the scope of the present invention.

$C_0$ of the Left Carry Circuit 101 is wired to O, implementing the operation A+B+0; and $C_0$ of the Right Carry Circuit 101 is wired to 1, implementing the operation of A+~B+1; ~B being equivalent to the 1's complement of B, or B inverted. The output of the Left Carry Circuit 101 is $C_{15}$, which is the carry out of bit position 14 and the carry in to bit position 15, the sign bit position of its 16-bit operation. The output of the Right Carry Circuit 102 is $C_{15}$, the carry in to bit position 15, the sign bit position of its 16-bit operation. Thus, the first carry circuit 101 outputs a first carry into a first sign bit position for the operation A+B+0 while the second carry circuit 102 outputs a second carry into a second sign bit position for the operation A+~B+1.

The Result Select Control circuit, or control means 103 receives $C_{15}$, the first carry from the Left Carry Circuit 101, on its $LC_{15}$ input and $C_{15}$, the second carry from the Right Carry Circuit 102, on its $RC_{15}$ input. Additionally, it receives $A_{15}$ and $B_{15}$, the sign bits of the input operands, and the operation signals MIN, MINM, MAX, and MAXM from the instruction decoder 106. MIN=1 if minimum operation is being performed; otherwise, MIN=0. MINM=1 if the minimum magnitude operation is being performed; otherwise, MINM=0. MAX=1 if the maximum operation is being performed, otherwise, MAX=0, MAXM=1 if the maximum magnitude operation is being performed; otherwise, MAXM=0. These control signals are mutually exclusive.

In response to these inputs, the Result Select Control circuit 103 will output a control signal, the SELECT A signal, which is connected to the multiplexer 104. If SELECT A=1, the multiplexer 104 connects the A input operand to RESULT. Otherwise, the multiplexer 104 connects the B input operand to RESULT. The SELECT A signal, and thus RESULT is a result of the following definitions of the minimum, minimum magnitude, maximum, and maximum magnitude functions:

MINIMUM if A < B
    then RESULT = A
else if A > B
    then RESULT = B
else RESULT = either A or B

MINIMUM MAGNITUDE if |A| < |B|
    then RESULT = A
else if |A| > |B|
    then RESULT = B
else if A < 0 and B > 0
    then RESULT = A
else if B < 0 and A > 0
    then RESULT = B
else RESULT = either A or B

MAXIMUM if A > B
    then RESULT = A
else if A < B
    then RESULT = B
else RESULT = either A or B

MAXIMUM MAGNITUDE if |A| > |B|
    then RESULT = A
else if |A| < |B|

-continued

```
        then RESULT = B
    else if A > 0 and B < 0
        then RESULT = A
    else if B > 0 and A < 0
        then RESULT = B
    else RESULT = either A or B
```

In the definitions, |A| refers to the magnitude (absolute value) of operand A, and |B| refers to the magnitude of operand B. There are certain stipulations about the results of the operations when the input operands are equal. In the minimum and maximum operations, when the operands are equal, the device is free to output either input operand as the result. In the minimum magnitude operation, if the magnitudes of both operands are equal and the input operands have opposite signs, the device returns the input operand that is negative (less than 0). If the magnitude of both operands are equal and the input operands have the same signs, either may be returned as the result. Analogously, in the maximum magnitude operation, if the magnitudes of both operands are equal and the input operands have opposite signs, the device returns the input operand that is positive (greater than 0). If the magnitude of both operands are equal and the input operands have the same signs, either may be returned as the result.

The following truth table, TABLE 1, illustrates the possible outputs (RESET) of the ALU which result from the various inputs signals.

dedicated parallel carry circuits, the Left Carry Circuit 101 and the Right Carry Circuit 102 (FIG. 4), were used to produce the $C_{15}$ signals input to the Result Select Control circuit 103. Such dedicated circuits may not be necessary should their function already exist in part of the design.

Figure 5:
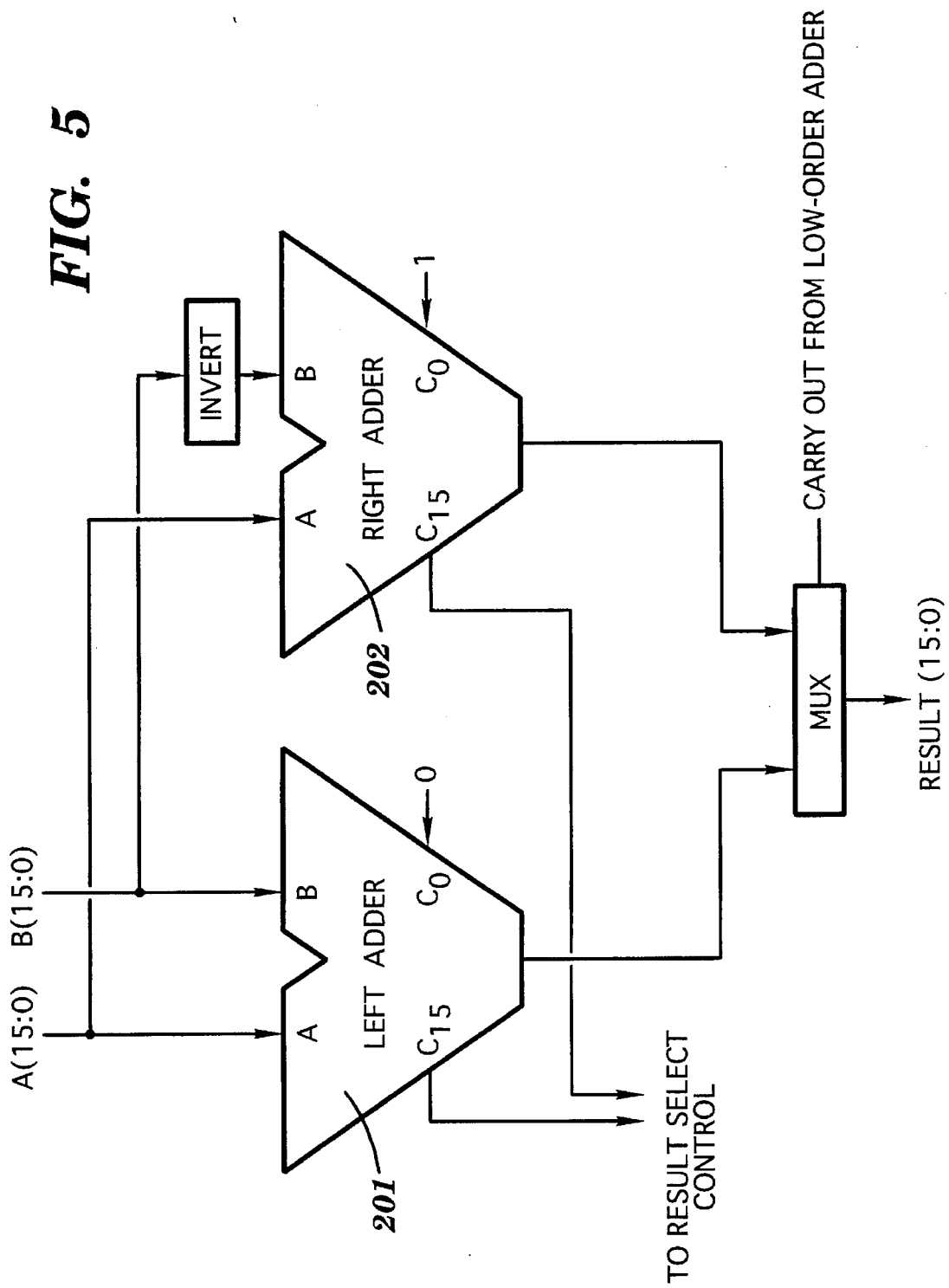
FIG. 5 is an alternative embodiment of the data processing system of the present invention.

The circuit shown in FIG. 5 is an accumulation adder circuit used in a high-speed architecture. This circuit includes carry-select adders that compute the high-order 16 bits of a 32-bit addition. Left Adder 201, with its $C_0$ wired to 0, and Right Adder 202, with its B input inverted and its $C_0$ wired to 1, each have carry circuits like the Left Carry Circuit 101 and the Right Carry Circuit 102 in FIG. 4. Thus, $C_{15}$ from Left Adder 201 and $C_{15}$ from Right Adder 202 result from the A+B+0 and A+−B +1 operations, respectively, and may be connected to the $LC_{15}$ and $RC_{15}$ inputs of a Result Select Control circuit 103 as shown in FIG. 4. No dedicated carry circuits would be necessary in this design to accomplish the same function as described in the preferred embodiment of the invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A data processing system for maximum/minimum number determination, comprising:

a) an input device;

TABLE 1

| $A_{15}$ | $B_{15}$ | $LC_{15}$ | $RC_{15}$ | MIN | MIN | MAX | MAX | SELECT | RESUL |
|---|---|---|---|---|---|---|---|---|---|
| 0 | 0 | X | 0 | 1 | 0 | 0 | 0 | 1 | A |
| 0 | 0 | X | 0 | 0 | 1 | 0 | 0 | 1 | A |
| 0 | 0 | X | 0 | 0 | 0 | 1 | 0 | 0 | B |
| 0 | 0 | X | 0 | 0 | 0 | 0 | 1 | 0 | B |
| 0 | 0 | X | 1 | 1 | 0 | 0 | 0 | 0 | B |
| 0 | 0 | X | 1 | 0 | 1 | 0 | 0 | 0 | B |
| 0 | 0 | X | 1 | 0 | 0 | 1 | 0 | 1 | A |
| 0 | 0 | X | 1 | 0 | 0 | 0 | 1 | 1 | A |
| 0 | 1 | 0 | X | 1 | 0 | 0 | 0 | 0 | B |
| 0 | 1 | 0 | X | 0 | 1 | 0 | 0 | 1 | A |
| 0 | 1 | 0 | X | 0 | 0 | 1 | 0 | 1 | A |
| 0 | 1 | 0 | X | 0 | 0 | 0 | 1 | 0 | B |
| 0 | 1 | 1 | X | 1 | 0 | 0 | 0 | 0 | B |
| 0 | 1 | 1 | X | 0 | 1 | 0 | 0 | 0 | B |
| 0 | 1 | 1 | X | 0 | 0 | 1 | 0 | 1 | A |
| 0 | 1 | 1 | X | 0 | 0 | 0 | 1 | 1 | A |
| 1 | 0 | 0 | X | 1 | 0 | 0 | 0 | 1 | A |
| 1 | 0 | 0 | X | 0 | 1 | 0 | 0 | 0 | B |
| 1 | 0 | 0 | X | 0 | 0 | 1 | 0 | 0 | B |
| 1 | 0 | 0 | X | 0 | 0 | 0 | 1 | 1 | A |
| 1 | 0 | 1 | X | 1 | 0 | 0 | 0 | 1 | A |
| 1 | 0 | 1 | X | 0 | 1 | 0 | 0 | 1 | A |
| 1 | 0 | 1 | X | 0 | 0 | 1 | 0 | 0 | B |
| 1 | 0 | 1 | X | 0 | 0 | 0 | 1 | 0 | B |
| 1 | 1 | X | 0 | 1 | 0 | 0 | 0 | 1 | A |
| 1 | 1 | X | 0 | 0 | 1 | 0 | 0 | 0 | B |
| 1 | 1 | X | 0 | 0 | 0 | 1 | 0 | 0 | B |
| 1 | 1 | X | 0 | 0 | 0 | 0 | 1 | 1 | A |
| 1 | 1 | X | 1 | 1 | 0 | 0 | 0 | 0 | B |
| 1 | 1 | X | 1 | 0 | 1 | 0 | 0 | 1 | A |
| 1 | 1 | X | 1 | 0 | 0 | 1 | 0 | 1 | A |
| 1 | 1 | X | 1 | 0 | 0 | 0 | 1 | 0 | B |

In TABLE 1, the symbol "X" is a logical "don't care," i.e. the input signal may be either 0 or 1. The truth table may be implemented using standard logic design techniques, such as logic synthesis.

FIG. 5 illustrates an alternate embodiment of the present invention. In the preferred embodiment of the invention, b) an arithmetic logic unit, including:

b1) a first input A, a second input B and an output;

b2) a first carry circuit outputting a first carry into a first sign bit position for an operation A+B;

b3) a second carry circuit outputting a second carry into a second sign bit position for an operation A+⁻B+1; and b4) multiplexing means to connect either A or B to said output of said arithmetic logic unit; and c) control means for receiving maximum, minimum, maximum magnitude, and minimum magnitude operation signals from said input device, said first carry from said first carry circuit, and said second carry from said second carry circuit, and for outputting a control signal to said multiplexing means to select either said A input or said B input as the output of said arithmetic logic unit in response to said signals inputted into said control means.

2. The data processing system of claim 1, wherein said first and second carry circuits are dedicated parallel carry circuits.

3. The data processing system of claim 1, wherein said control circuit further comprises an input for receiving a sign bit from said A input and a sign bit from said B input.

4. The data processing system of claim 1, wherein said input device is an instruction decoder.

5. A data processing system for minimum/maximum number determination, comprising:

a) an instruction decoder;

b) an arithmetic logic unit, including:

b1) a first input A, a second input B, and an output;

b2) a first adder circuit for adding input A to input B and outputting a first carry into a first sign bit position; said first carry resulting from adding input A to input B;

b3) a second adder circuit for adding input A, an inverse of input B, and one, and outputting a second carry into a second sign bit position; said second carry resulting from adding input A, an inverse of input B, and one; and b4) a multiplexing device to connect one of said A or said B to said output of said arithmetic logic unit; and c) a control circuit for receiving maximum, minimum, maximum magnitude, and minimum magnitude operation signals from said instruction decoder, said first carry from said first adder circuit, and said second carry from said second adder circuit, and for outputting a control signal to said multiplexing device to one of said A input or said B input as the output of said arithmetic logic unit in response to said signals and said first and second carry inputted into said control circuit.

6. The data processing system of claim 5, wherein said control means further comprises an input for receiving a sign bit from said A input and a sign bit from said B input.

7. A method for minimum/maximum number determination in a data processing system, comprising the steps of:

a) inputting a first input A and a second input B into an arithmetic logic unit;

b) adding said input A to said input B in a first carry circuit;

c) outputting a first carry resulting from said addition of input A to input B into a first sign bit position;

d) adding said input A, an inverse of input B and one in a second carry circuit;

e) outputting a second carry resulting from said addition of said input A, said inverse of input B and one, into a second sign bit position;

f) inputting maximum, minimum, maximum magnitude, and minimum magnitude operation signals from a instruction decoder, said first carry from said first adder circuit, and said second carry from said second adder circuit into a control circuit;

g) outputting a control signal to a multiplexing device to select one of said A input or said B input in response to said inputs into said control circuit; and i) outputting said selected A or B input from said arithmetic logic unit with a multiplexing device.

8. The method of claim 7, wherein said first and second carry circuits are dedicated parallel carry circuits.

9. The method of claim 7, wherein said step of inputting said signals and said first and second carry into said control circuit further comprises the step of inputting a sign bit from said A input and a sign bit from said B input into said control circuit.

* * * * *